(12) United States Patent
Morein et al.

(10) Patent No.: US 9,244,581 B2
(45) Date of Patent: Jan. 26, 2016

(54) MODULATED POWER SUPPLY FOR REDUCED PARASITIC CAPACITANCE

(71) Applicant: Synaptics Incorporated, San Jose, CA (US)

(72) Inventors: Stephen L. Morein, San Jose, CA (US); Joseph Kurth Reynolds, Alviso, CA (US)

(73) Assignee: SYNAPTICS INCORPORATED, San Jose, CA (US)

( * ) Notice: Subject to any disclaimer, the term of this patent is extended or adjusted under 35 U.S.C. 154(b) by 65 days.

(21) Appl. No.: 14/278,893

(22) Filed: May 15, 2014

(65) Prior Publication Data

US 2015/0091850 A1 Apr. 2, 2015

Related U.S. Application Data

(63) Continuation-in-part of application No. 14/042,694, filed on Sep. 30, 2013, now Pat. No. 8,766,950.

(51) Int. Cl.
*G06F 3/041* (2006.01)
*G06F 3/044* (2006.01)

(52) U.S. Cl.
CPC .............. *G06F 3/044* (2013.01); *G06F 3/0412* (2013.01); *G06F 3/0416* (2013.01); *G06F 3/0418* (2013.01)

(58) Field of Classification Search
None
See application file for complete search history.

(56) References Cited

U.S. PATENT DOCUMENTS

| | | | |
|---|---|---|---|
| 4,550,310 A | 10/1985 | Yamaguchi et al. | |
| 6,054,979 A | 4/2000 | Sellers | |
| 7,859,521 B2 | 12/2010 | Hotelling et al. | |
| 8,243,027 B2 | 8/2012 | Hotelling et al. | |
| 8,258,986 B2 | 9/2012 | Makovetskyy | |
| 8,305,359 B2 | 11/2012 | Bolender et al. | |
| 2001/0006999 A1 | 7/2001 | Konno et al. | |
| 2008/0062140 A1 | 3/2008 | Hotelling et al. | |
| 2008/0062147 A1 | 3/2008 | Hotelling et al. | |
| 2008/0246723 A1 | 10/2008 | Baumbach | |
| 2010/0001973 A1 | 1/2010 | Hotelling et al. | |
| 2010/0013791 A1* | 1/2010 | Haga .................... | G06F 3/0412 345/174 |
| 2010/0117986 A1 | 5/2010 | Yang | |
| 2010/0144391 A1 | 6/2010 | Chang et al. | |
| 2010/0193257 A1 | 8/2010 | Hotelling et al. | |
| 2010/0194695 A1 | 8/2010 | Hotelling et al. | |

(Continued)

OTHER PUBLICATIONS

Written Opinion of the International Searching Authority and and the International Search Report PCT/US2014/050013—13 pages dated Nov. 18, 2014.

*Primary Examiner* — Joseph Haley
(74) *Attorney, Agent, or Firm* — Patterson + Sheridan, LLP

(57) ABSTRACT

An input device comprising a display device having an integrated capacitive sensing device. The input device includes a plurality of sensor electrodes a plurality of display electrodes, a modulated power supply configured to provide a modulated reference signal, and a processing system. The processing system includes a sensor module configured to drive a plurality of sensor electrodes with a modulated capacitive sensing signal that is based on the modulated reference signal for capacitive sensing during a first time period. The processing system also includes a display driver module configured to drive a plurality of display electrodes of a display device with modulated signals based on the modulated reference signal during the first time period. The modulated signals cause voltage between the plurality of display electrodes and the plurality of sensor electrodes to remain substantially constant.

21 Claims, 10 Drawing Sheets

(56) References Cited

U.S. PATENT DOCUMENTS

| | | |
|---|---|---|
| 2010/0194697 A1 | 8/2010 | Hotelling et al. |
| 2011/0007030 A1 | 1/2011 | Mo et al. |
| 2011/0025635 A1 | 2/2011 | Lee |
| 2011/0242050 A1 | 10/2011 | Byun et al. |
| 2011/0242444 A1 | 10/2011 | Song |
| 2011/0248949 A1 | 10/2011 | Chang et al. |
| 2011/0298746 A1 | 12/2011 | Hotelling |
| 2012/0038585 A1 | 2/2012 | Kim |
| 2012/0162133 A1 | 6/2012 | Chen et al. |
| 2012/0206154 A1 | 8/2012 | Pant et al. |
| 2012/0218199 A1 | 8/2012 | Kim et al. |
| 2013/0057507 A1 | 3/2013 | Shin et al. |
| 2013/0057511 A1 | 3/2013 | Shepelev et al. |
| 2013/0088372 A1 | 4/2013 | Lundstrum et al. |
| 2013/0162570 A1 | 6/2013 | Shin et al. |
| 2013/0215075 A1 | 8/2013 | Lee et al. |
| 2013/0249850 A1 | 9/2013 | Bulea |
| 2013/0307820 A1 | 11/2013 | Kim |
| 2013/0314343 A1 | 11/2013 | Cho et al. |

* cited by examiner

MODULATED POWER SUPPLY FOR REDUCED PARASITIC CAPACITANCE

CROSS-REFERENCE TO RELATED APPLICATION

This application is a continuation-in-part of U.S. patent application Ser. No. 14/042,694 filed Sep. 30, 2013, which is incorporated by reference in its entirety.

BACKGROUND OF THE INVENTION

1. Field of the Invention

Embodiments of the present invention generally relate to a method and apparatus for touch sensing, and more specifically, a capacitive touch sensing device having a modulated power supply.

2. Description of the Related Art

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones).

Many proximity sensor devices utilize an array of sensor electrodes to measure a change in capacitance indicative of the presence of an input object, such as a finger or stylus, proximate the sensor electrode. Many schemes are possible for capacitive touch sensing. In one scheme, "matrix sensing," sensor electrodes arranged in a grid or "matrix" are driven to generate a capacitive image. The sensor electrodes may be driven in an absolute capacitance mode, in which the sensor electrodes are driven with a signal to determine the degree of capacitive coupling between the sensor electrodes and an input object, if present.

Sensor electrodes driven in absolute sensing mode may experience effects related to parasitic capacitances between the sensor electrodes and conductive objects other than an input object. More specifically, conductive objects that are associated with the input device contribute to the capacitance sensed by a sensor electrode driven for capacitive sensing. The existence of parasitic capacitance reduces the ability to detect the presence of an input object. This issue is more acute in "in-cell" display embodiments, in which the sensing electrode is a part of a display pixel cell, and therefore the sensing electrode is very close to several conductive elements, such as the pixel electrode of a display cell, and the terminals of a pixel transistor, among others.

Thus, there is a need for an improved proximity sensor device.

SUMMARY OF THE INVENTION

Embodiments described herein include an input device comprising a display device having an integrated capacitive sensing device, a method for capacitive sensing, and a processing system for a display device comprising an integrated input sensing device.

In one embodiment, an input device includes a plurality of sensor electrodes a plurality of display electrodes, a modulated power supply configured to provide a modulated reference signal, and a processing system. The processing system includes a sensor module configured to drive a plurality of sensor electrodes with a modulated capacitive sensing signal that is based on the modulated reference signal for capacitive sensing during a first time period. The processing system also includes a display driver module configured to drive a plurality of display electrodes of a display device with modulated signals based on the modulated reference signal during the first time period. The modulated signals cause voltage between the plurality of display electrodes and the plurality of sensor electrodes to remain substantially constant.

In another embodiment, a method includes driving a plurality of sensor electrodes with a modulated capacitive sensing signal that is based on a modulated reference signal for capacitive sensing during a first time period. The method also includes driving a plurality of display electrodes of a display device with modulated signals based on the modulated reference signal during the first time period. The modulated signals cause voltage between the plurality of display electrodes and the plurality of sensor electrodes to remain substantially constant.

In another embodiment, a processing system includes a sensor module configured to drive a plurality of sensor electrodes with a modulated capacitive sensing signal that is based on a modulated reference signal for capacitive sensing during a first time period. The processing system also includes a display driver module configured to drive a plurality of display electrodes of a display device with modulated signals based on the modulated reference signal during the first time period. The modulated signals cause voltage between the plurality of display electrodes and the plurality of sensor electrodes to remain substantially constant.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

Figure 1:
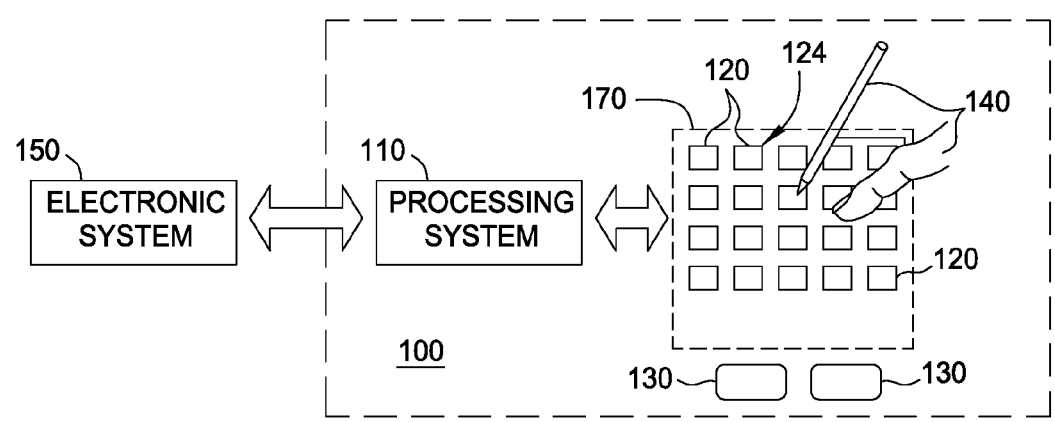
FIG. 1 is a schematic block diagram of an input device.

To facilitate understanding, identical reference numerals have been used, where possible, to designate identical elements that are common to the figures. It is contemplated that elements disclosed in one embodiment may be beneficially utilized on other embodiments without specific recitation. The drawings referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Various embodiments of the present technology provide input devices and methods for reducing parasitic capacitance in a capacitive sensing input device. Particularly, embodiments described herein advantageously utilize a modulated power supply to modulate signals within an input device to reduce the parasitic capacitances experienced by sensor electrodes in the input device. Additionally, some other embodiments provide an input device integrated with a display device that includes a modulated power supply to modulate signals provided to display elements and touch sensing elements within the display and input devices.

FIG. 1 is a schematic block diagram of an input device 100, in accordance with embodiments of the present technology. Although the illustrated embodiments of the present disclosure are shown as an input device integrated with a display device, it is contemplated that the invention may be embodied in the input devices that are not integrated with display devices. The input device 100 may be configured to provide input to an electronic system 150. As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system, or can be physically separate from the electronic system. As appropriate, the input device 100 may communicate with parts of the electronic system using any one or more of the following: buses, networks, and other wired or wireless interconnections. Examples include I²C, SPI, PS/2, Universal Serial Bus (USB), Bluetooth, RF, and IRDA.

In FIG. 1, the input device 100 is shown as a proximity sensor device (also often referred to as a "touchpad" or a "touch sensor device") configured to sense input provided by one or more input objects 140 in a sensing region 170. Example input objects include fingers and styli, as shown in FIG. 1.

Sensing region 170 encompasses any space above, around, in and/or near the input device 100 in which the input device 100 is able to detect user input (e.g., user input provided by one or more input objects 140). The sizes, shapes, and locations of particular sensing regions may vary widely from embodiment to embodiment. In some embodiments, the sensing region 170 extends from a surface of the input device 100 in one or more directions into space until signal-to-noise ratios prevent sufficiently accurate object detection. The distance to which this sensing region 170 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g. a touch surface) of the input device 100, contact with an input surface of the input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region 170 has a rectangular shape when projected onto an input surface of the input device 100.

The input device 100 may utilize any combination of sensor components and sensing technologies to detect user input in the sensing region 170. The input device 100 comprises a plurality of sensing elements 124 for detecting user input. The sensing elements 124 include a plurality of sensor electrodes 120. As several non-limiting examples, the input device 100 may use capacitive, elastive, resistive, inductive, magnetic acoustic, ultrasonic, and/or optical techniques.

Some implementations are configured to provide images that span one, two, three, or higher dimensional spaces. Some implementations are configured to provide projections of input along particular axes or planes.

In some resistive implementations of the input device 100, a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device 100, one or more sensing elements 124 pickup loop currents induced by a resonating coil or pair of coils. Some combination of the magnitude, phase, and frequency of the currents may then be used to determine positional information.

In some capacitive implementations of the input device 100, voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements 124 to create electric fields. In some capacitive implementations, separate sensing elements 124 may be ohmically shorted together to form larger sensor electrodes. Some capacitive implementations utilize resistive sheets, which may be uniformly resistive.

As discussed above, some capacitive implementations utilize "self capacitance" (or "absolute capacitance") sensing methods based on changes in the capacitive coupling between sensor electrodes 120 and an input object. In various embodiments, an input object near the sensor electrodes 120 alters the electric field near the sensor electrodes 120, thus changing the measured capacitive coupling. In one implementation, an absolute capacitance sensing method operates by modulating sensor electrodes 120 with respect to a reference voltage (e.g, system ground), and by detecting the capacitive coupling between the sensor electrodes 120 and input objects 140.

Additionally as discussed above, some capacitive implementations utilize "mutual capacitance" (or "transcapacitance") sensing methods based on changes in the capacitive coupling between sensor electrodes 120. In various embodiments, an input object 140 near the sensor electrodes 120 alters the electric field between the sensor electrodes 120, thus changing the measured capacitive coupling. In one implementation, a transcapacitive sensing method operates by detecting the capacitive coupling between one or more transmitter sensor electrodes (also "transmitter electrodes") and one or more receiver sensor electrodes (also "receiver electrodes") as further described below. Transmitter sensor electrodes may be modulated relative to a reference voltage (e.g., system ground) to transmit a modulated signals. Receiver sensor electrodes may be held substantially constant relative to the reference voltage to facilitate receipt of resulting signals. A resulting signal may comprise effect(s) corresponding to one or more modulated signals, and/or to one or more sources of environmental interference (e.g. other electromagnetic signals). Sensor electrodes 120 may be dedicated transmitter electrodes or receiver electrodes, or may be configured to both transmit and receive.

In FIG. 1, the processing system 110 is shown as part of the input device 100. The processing system 110 is configured to operate the hardware of the input device 100 to detect input in the sensing region 170. The processing system 110 comprises parts of or all of one or more integrated circuits (ICs) and/or other circuitry components. (For example, a processing system for a mutual capacitance sensor device may comprise transmitter circuitry configured to transmit signals with transmitter sensor electrodes, and/or receiver circuitry configured to receive signals with receiver sensor electrodes). In some embodiments, the processing system 110 also comprises electronically-readable instructions, such as firmware code, software code, and/or the like. In some embodiments, components composing the processing system 110 are located together, such as near sensing element(s) 124 of the input device 100. In other embodiments, components of processing system 110 are physically separate with one or more components close to sensing element(s) 124 of input device 100, and one or more components elsewhere. For example, the input device 100 may be a peripheral coupled to a desktop computer, and the processing system 110 may comprise software configured to run on a central processing unit of the desktop computer and one or more ICs (perhaps with associated firmware) separate from the central processing unit. As another example, the input device 100 may be physically integrated in a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc. In one or more embodiments, a grid electrode may be disposed between two or more sensor electrodes 120 and processing system 110 may be configured to drive the guard electrode with a guarding signal which may be configured to guard the sensor electrodes. In one embodiment, the guarding signal may be a shielding signal that is configured to guard and shield the sensor electrodes. The grid electrode may be disposed on the same layer as the sensor electrode and comprise one or more common electrodes. In other embodiments, the grid electrode may be disposed on a layer separate from the sensor electrodes. In on embodiment, a first grid electrode may be disposed on a first layer common with the sensor electrode a second grid electrode may be disposed on a second layer that is between the sensor electrodes and an input surface of the input device 100. In one embodiment, the grid electrode may be segmented in to multiple segments that may be driven individually by the processing system 110. In one embodiment a first grid electrode is disposed such that it at least partially circumscribes a first subset of sensor electrodes and a second grid electrode is disposed such that it is at least partially circumscribes a second subset of sensor electrodes. In other embodiments, the input device 100 may comprise more than two grid electrodes. In various embodiments, the grid electrode may be referred to as grid electrode. The grid electrode(s) and the sensor electrode may encompass the entire surface of the Vcom electrode.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) 124 to detect input, identification modules configured to identify gestures such as mode changing gestures, and mode changing modules for changing operation modes.

In some embodiments, the processing system 110 responds to user input (or lack of user input) in the sensing region 170 directly by causing one or more actions. Example actions include changing operation modes, as well as GUI actions such as cursor movement, selection, menu navigation, and other functions. In some embodiments, the processing system 110 provides information about the input (or lack of input) to some part of the electronic system (e.g. to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions.

For example, in some embodiments, the processing system 110 operates the sensing element(s) 124 of the input device 100 to produce electrical signals indicative of input (or lack of input) in the sensing region 170. The processing system 110 may perform any appropriate amount of processing on the electrical signals in producing the information provided to the electronic system. For example, the processing system 110 may digitize analog electrical signals obtained from the sensing elements 124. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the sensing region 170, or some other functionality, FIG. 1 shows buttons 130 near the sensing region 170 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 170 overlaps at least part of an active area of a display screen of the display device 160. For example, the input device 100 may comprise substantially transparent sensing elements 124 overlaying the display screen and provide a touch screen interface for the associated electronic system. The display screen may be any type of dynamic display capable of displaying a visual interlace to a user, and may include any type of light emitting diode (LED), organic LED (OLED), cathode ray tube (CRT), liquid crystal display (LCD), plasma, electroluminescence (EL), or other display technology. The input device 100 and the display device 160 may share physical elements. For example, some embodiments may utilize some of the same electrical components for displaying and sensing. As another example, the display device 160 may be operated in part or in total by the processing system 110.

It should be understood that while many embodiments of the present technology are described in the context of a fully functioning apparatus, the mechanisms of the present technology are capable of being distributed as a program product (e.g., software) in a variety of forms. For example, the mechanisms of the present technology may be implemented and distributed as a software program on information bearing media that are readable by electronic processors (e.g., non-transitory computer-readable and/or recordable/writable information bearing media readable by the processing system 110). Additionally, the embodiments of the present technology apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

Figure 2A:
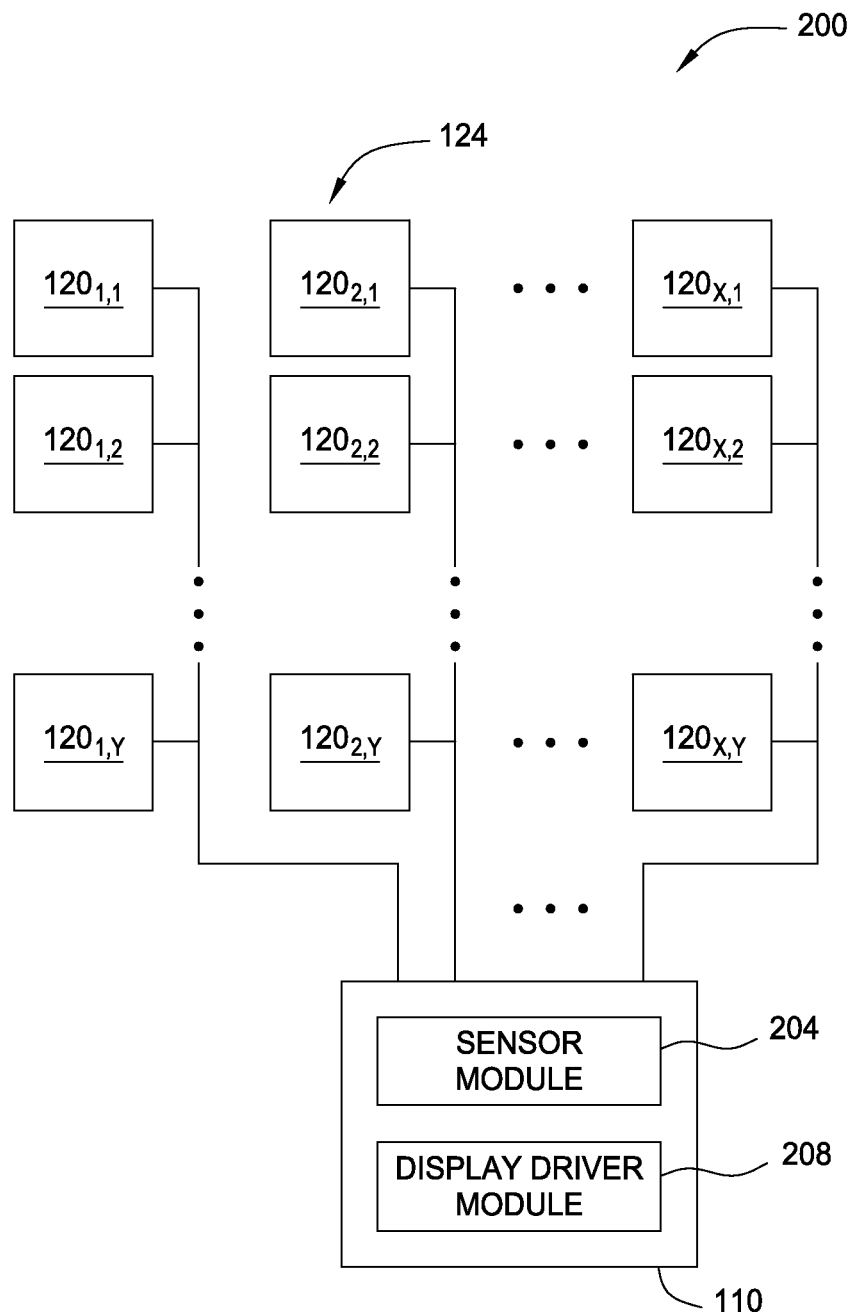
FIG. 2A illustrates a simplified exemplary array of sensor elements that may be used in the input device of FIG. 1.

FIG. 2A shows a portion of an exemplary pattern 200 of sensing elements 124 configured to sense in the sensing region 170 associated with the pattern 200, according to some embodiments. For clarity of illustration and description, FIG. 2A shows the sensor electrodes 120 of the sensing elements 124 in a pattern of simple rectangles, and does not show various other components. The exemplary pattern 200 of sensing elements 124 comprises an array of sensor electrodes $120_{X,Y}$ (referred collectively as sensor electrodes 120) arranged in X columns and Y rows, wherein X and Y are positive integers. It is contemplated that the pattern of sensing elements 124 comprises a plurality of sensor electrodes 120 having other configurations, such as polar arrays, repeating patterns, non-repeating patterns, a single row or column, or other suitable arrangement. The sensor electrodes 120 are coupled to the processing system 110 and utilized to determine the presence (or lack thereof) of an input object 140 in the sensing region 170.

In a first mode of operation, the arrangement of sensor electrodes 120 (120-1, 120-2, 120-3, . . . 120-$n$) may be utilized to detect the presence of an input object via absolute sensing techniques. That is, processing system 110 is configured to drive each sensor electrode 120 with a signal and receive a resulting signal comprising effects corresponding to the modulated signal, which is utilized by the processing system 110 or other processor to determine the position of the input object.

The sensor electrodes 120 are typically ohmically isolated from each other. That is, one or more insulators separate the sensor electrodes 120 and prevent them from electrically shorting to each other. In some embodiments, the sensor electrodes 120 are separated by an insulative gap. The insulative gap separating the sensor electrodes 120 may be filled with an electrically insulating material, or may be an air gap.

In a second mode of operation, the sensor electrodes 120 (120-1, 120-2, 120-3, . . . 120-$n$) may be utilized to detect the presence of an input object via profile sensing techniques. That is, processing system 110 is configured to drive the sensor electrodes 120 row-by-row and then column-by-column, with modulated signals. The signals generated in response to driving the sensor electrodes 120 in this configuration provide information related to the position of an input object 140 within the sensing region.

In a third mode of operation, the sensor electrodes 120 may be split into groups of transmitter and receiver electrodes utilized to detect the presence of an input object via transcapacitive sensing techniques. That is, processing system 110 may drive a first group of sensor electrodes 120 with a modulated signal and receive resulting signals with the second group of sensor electrodes 120, where a resulting signal comprising effects corresponding to the modulated signal. The resulting signal is utilized by the processing system 110 or other processor to determine the position of the input object.

The input device 100 may be configured to operate in any one of the modes described above. The input device 100 may also be configured to switch between any two or more of the modes described above.

Areas of localized capacitive coupling may be termed "capacitive pixels." Capacitive pixels may be formed between an individual sensor electrode 120 and ground in the first mode of operation, between groups of sensor electrodes 120 and ground in the second mode of operation, and between groups of sensor electrodes 120 used as transmitter and receiver electrode in the third mode of operation. The capacitive coupling changes with the proximity and motion of input objects 140 in the sensing region 170 associated with the sensing elements 124, and thus may be used as an indicator of the presence of the input object in the sensing region of the input device 100.

In some embodiments, the sensor electrodes 120 are "scanned" to determine these capacitive couplings. That is, in one embodiment, one or more of the sensor electrodes 120 are driven to transmit modulated signals. Transmitters may be operated such that one transmitter electrode transmits at one time, or multiple transmitter electrodes transmit at the same time. Where multiple transmitter electrodes transmit simultaneously, the multiple transmitter electrodes may transmit the same modulated signal and effectively produce an effectively larger transmitter electrode. Alternatively, the multiple transmitter electrodes may transmit different modulated signals. For example, multiple transmitter electrodes may transmit different modulated signals according to one or more coding schemes that enable their combined effects on the resulting signals to be independently determined.

The sensor electrodes 120 configured as receiver sensor electrodes may be operated singly or multiply to acquire resulting signals. The resulting signals may be used to determine measurements of the capacitive couplings at the capacitive pixels.

In another embodiment, the sensor electrodes may be operated such that more than one sensor electrodes is driven and received with at a time, or sensor electrodes are driven and received with at the same time. In such embodiments, an absolute capacitive measurement may be obtained from each of the one or more sensor electrodes 120 simultaneously.

In one embodiment each of the sensor electrodes 120 are simultaneously driven and received with, obtaining an absolute capacitive measurement simultaneously from each of the sensor electrodes 120. In various embodiments, processing system 110 may configured to selectively drive and receive with a portion of sensor electrodes 120. For example, the sensor electrodes may be selected based on, but not limited to, an application running on the host processor, a status of the input device, and an operating mode of the sensing device.

A set of measurements from the capacitive pixels form a "capacitive image" (also "capacitive frame") representative of the capacitive couplings at the pixels. Multiple capacitive images may be acquired over multiple time periods, and differences between them used to derive information about input in the sensing region. For example, successive capacitive images acquired over successive periods of time can be used to track the motion(s) of one or more input objects entering, exiting, and within the sensing region.

The background capacitance of the input device 100 is the capacitive image associated with no input object in the sensing region 170. The background capacitance changes with the environment and operating conditions, and may be estimated in various ways. For example, some embodiments take "baseline images" when no input object is determined to be in the sensing region 170, and use those baseline images as estimates of their background capacitances.

Capacitive images can be adjusted for the background capacitance of the input device 100 for more efficient processing. Some embodiments accomplish this by "baselining" measurements of the capacitive couplings at the capacitive pixels to produce a "baselined capacitive image." That is, some embodiments compare the measurements forming a capacitance image with appropriate "baseline values" of a "baseline image" associated with those pixels, and determine changes from that baseline image.

In some touch screen embodiments, one or more of the sensor electrodes 120 comprise one or more common electrodes used in updating the display of the display screen. In one or more embodiment, the common electrodes comprise one or more segments of a $V_{COM}$ electrode, a source drive line, gate line, an anode electrode or cathode electrode, or any other display element. These common electrodes may be disposed on an appropriate display screen substrate. For example, the common electrodes may be disposed on the a transparent substrate (a glass substrate, TFT glass, or any other transparent material) in some display screens (e.g., In Plane Switching (IPS) or Plane to Line Switching (PLS) Organic Light Emitting Diode (OLED)), on the bottom of the color filter glass of some display screens (e.g., Patterned Vertical Alignment (PVA) or Multi-domain Vertical Alignment (MVA)), over an emissive layer (OLED), etc. In such embodiments, the common electrode can also be referred to as a "combination electrode", since it performs multiple functions. In various embodiments, each of the sensor electrodes 120 comprises one or more common electrodes. In other embodiments, at least two sensor electrodes 120 may share at least one common electrode.

In various touch screen embodiments, the "capacitive frame rate" (the rate at which successive capacitive images are acquired) may be the same or be different from that of the "display frame rate" (the rate at which the display image is updated, including refreshing the screen to redisplay the same image). In various embodiments, the capacitive frame rate is an integer multiple of the display frame rate. In other embodiments, the capacitive frame rate is a fractional multiple of the display frame rate. In yet further embodiments, the capacitive frame rate may be any fraction or integer of the display frame rate.

Continuing to refer to FIG. 2A, the processing system 110 coupled to the sensing electrodes 120 includes a sensor module 204 and optionally, a display driver module 208. The sensor module 204 includes circuitry configured to drive a modulated signal onto the sensing electrodes 120 during periods in which input sensing is desired. The modulated signal is generally a modulated signal containing one or more bursts over a period of time allocated for input sensing. The modulated signal may have an amplitude, frequency and voltage which may be changed to obtain more robust location information of the input object in the sensing region 170. The sensor module 204 may be selectively coupled to one or more of the sensor electrodes 120. For example, the sensor module 204 may be coupled to selected portions of the sensor electrodes 120.

In another example, the sensor module 204 may be coupled to a different portion of the sensor electrodes 120. In yet another example, the sensor module 204 may be coupled to all the sensor electrodes 120 and operate in either an absolute or transcapacitive sensing mode.

In one or more embodiments, capacitive sensing (or input sensing) and display updating may occur during at least partially overlapping periods. For example, as a common electrode is driven for display updating, the common electrode may also be driven for capacitive sensing. In another embodiment, capacitive sensing and display updating may occur during non-overlapping periods, also referred to as non-display update periods. In various embodiments, the non-display update periods may occur between display line update periods for two display lines of a display frame and may be at least as long in time as the display update period. In such embodiment, the non-display update period may be referred to as a long horizontal blanking period, long h-blanking period or a distributed blanking period. In other embodiments, the non-display update period may comprise horizontal blanking periods and vertical blanking periods. Processing system 110 may be configured to drive sensor electrodes 120 for capacitive sensing during any one or more of or any combination of the different non-display update times, or during a display update time.

The sensor module 204 also includes circuitry configured to receive a resulting signal with the sensor electrodes 120 comprising effects corresponding to the modulated signal during periods in which input sensing is desired. The sensor module 204 may determine a position of the input object 140 in the sensing region 170 or may provide a signal including information indicative of the resulting signal to another module or processor, for example, a determination module or a processor of the electronic device 150 (i.e., a host processor), for determining the position of the input object 140 in the sensing region 170.

The display driver module 208 may be included in or separate from the processing system 110. The display driver module 208 includes circuitry configured to provide display image update information to the display of the display device 160 during non-sensing (e.g., display updating) periods or during sensing periods.

As discussed above, the sensor electrodes 120 of the sensing elements 124 may be formed as discrete geometric forms, polygons, bars, pads, lines or other shape, which are ohmically isolated from one another. The sensor electrodes 120 may be electrically coupled through circuitry to form electrodes of having larger plan area relative to a discrete one of the sensor electrodes 120. The sensor electrodes 120 may be fabricated from opaque or non-opaque conductive materials. In embodiments wherein the sensor electrodes 120 are utilized with a display device, it may be desirable to utilize non-opaque conductive materials for the sensor electrodes 120. In embodiments wherein the sensor electrodes 120 are not utilized with a display device, it may be desirable to utilize opaque conductive materials having lower resistivity for the sensor electrodes 120 to improve sensor performance. Materials suitable for fabricating the sensor electrodes 120 include ITO, aluminum, silver, copper, and conductive carbon materials, among others. The sensor electrodes 120 may be formed as contiguous body of conductive material having little or no open area (i.e., having a planar surface uninterrupted by holes), or may alternatively be fabricated to form a body of material having openings formed therethrough. For example, the sensor electrodes 120 may be formed of a mesh of conductive material, such as a plurality of interconnected thin metal wires. In one embodiment, at least one of the length and width of the sensor electrodes 120 may be in a range of about 1 to about 2 mm. In other embodiments, at least one of the length and width of the sensor electrodes may be less than about 1 mm or greater than about 2 mm. In other embodiment, the length and width may not be similar, and one of the length and width may be in the range of about 1 to about 2 mm. Further, on various embodiments, the sensor electrodes 120 may comprise a center to center pitch in the range of about 4 to about 5 mm; however, in other embodiments, the pitch may be less than about 4 mm or greater than about 5 mm.

Modulated Power Supply for Reduced Parasitic Capacitance

When the sensor electrodes 120 are being driven with modulated signals for capacitive sensing, the sensor electrodes 120 may experience effects related to parasitic capacitance due to capacitive coupling between the sensor electrodes 120 and other nearby conductive components such as other sensor electrodes 120, as well as traces and other electrodes. In some embodiments, this parasitic capacitance can reduce the ability to detect the presence of that input object through the use of capacitive sensing techniques.

To reduce the effects related to parasitic capacitance, the power supply that provides power to the various components of the input device 100 is configured to generate modulated power supply signals and a modulated ground signal. The modulated power supply signals and modulated ground signal cause the various components of the input device 100 described above that would normally be held at a substantially constant voltage with respect to earth ground to instead be driven with a modulated signal with respect to earth ground. In other words, by powering the input device 100 with a modulated power supply, various signals in the input device 100 are modulated. The sensor electrodes 120 can then be operated simply by maintaining the sensor electrodes 120 at a constant voltage with respect to the modulated ground signal. Since the input object 140 is (generally) at earth ground, the voltage differential between the sensor electrodes 120 and the input object 140 varies with time. Further, by maintaining the sensor electrodes 120 at a constant voltage with respect to the modulated ground signal, and thus other components of the input device 100, parasitic capacitance experienced by the sensor electrodes 120 is reduced. More specifically, parasitic capacitance is reduced because the voltage of the sensor electrodes 120 remains substantially constant with respect to other components of the input device 100.

In various embodiments, input device 100 may comprise display device 160 having an integrated input sensing device. As is described above, in such embodiments, one or more display electrodes may be configured to perform both display updating and capacitive sensing. During display update periods, an electrode in the $V_{COM}$ layer (common electrode or $V_{COM}$ electrode) forms the fixed electrode for the storage capacitor and liquid crystal material, with the charge stored between the $V_{COM}$ electrode and the pixel electrode. The amount of charge stored between the $V_{COM}$ electrode and pixel electrode determine the transmission of light. For an OLED, during display update periods an electrode in the cathode layer (common electrode or cathode electrode) forms the fixed electrode for the storage capacitor, with the charge stored between the cathode layer and an anode layer. During an input sensing period, the one or more common electrodes corresponding to sensor electrodes 120 are driven to a first voltage potential and the resulting charge that is required drive the sensor electrode(s) to the first voltage potential is measured by the sensor module 204. In various embodiments, the sensor electrodes may be driven with a modulated voltage that transitions the sensor electrode(s) between a first voltage potential and a second voltage potential. In other embodiments, processing system 110 may be configured to drive a sensor electrode with a predetermined amount of charge and the corresponding voltage on the sensor electrode is measured. In any of the above embodiments, the signal driven onto the sensor electrode may be referred to as a modulated signal and the charge or current that is measured may be referred to as resulting signals that are received with the sensor electrode(s). The resulting signal comprises both local parasitic capacitances between a sensor electrode and proximate conductors and the capacitance between the sensor electrode and the input object. In various embodiments, the capabilities of the sensor module 204 and the input device 100 may be improved by reducing the parasitic capacitances that are present in the resulting signals.

Figure 2B:
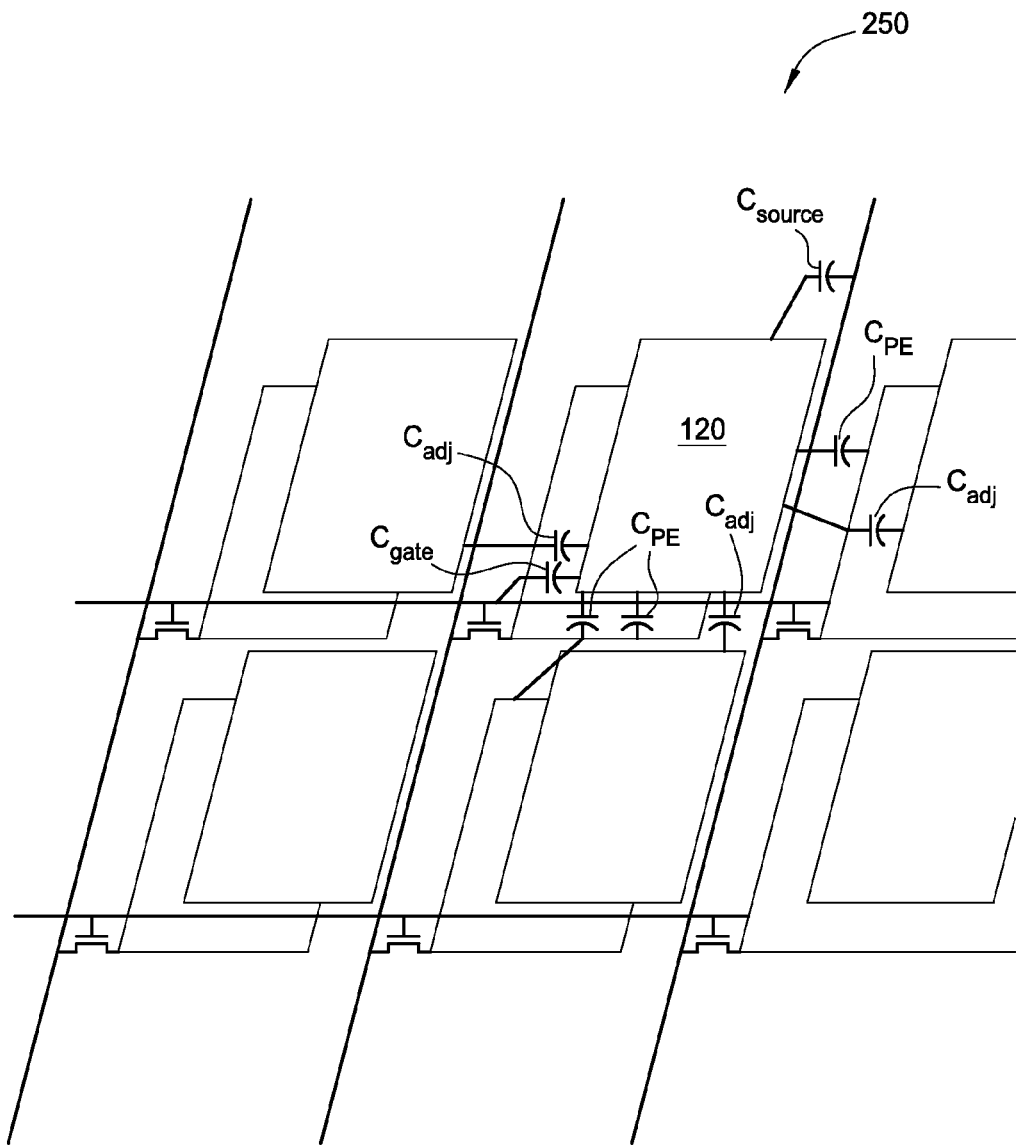
FIG. 2B is an isometric schematic view of a display device integrated with an input device, illustrating parasitic capacitance.

FIG. 2B illustrates a plurality of the local parasitic capacitances for sensor electrode 120. In the illustrated embodiment, Csource represents the parasitic capacitance between the sensor electrode and a source line, Cadj represents the parasitic capacitance between the sensor electrode and adjacent (or proximate) sensor electrodes, Cpe represents the parasitic capacitance between the sensor electrode and the pixel electrode and Cgate represents the parasitic capacitance between the sensor electrode and a gate line. The parasitic capacitances illustrated in FIG. 2B may a subset of a larger number of parasitic capacitances. Further, in various embodiments, there may be parasitic capacitive couplings between the sensor electrode and multiple gate lines, source lines, adjacent sensor electrodes and/or pixel electrodes.

In one embodiment, a parasitic capacitance may be substantially reduced or eliminated by driving a guarding signal onto a sensor electrode that is near to a sensor electrode that is driven for capacitive sensing and/or onto an electrode that serves another purpose, such as display updating. The guarding signal may be configured such that relative voltage between electrodes (i.e., gate line, source line, sensor electrodes) is substantially constant. Therefore, to eliminate or reduce the parasitic capacitance between a sensor electrode driven with a modulated signal for capacitive sensing and nearby electrodes, the nearby electrodes are driven with a guarding signal that is similar to the modulated signal in at least one of frequency, phase and/or amplitude. This guarding signal may be referred to herein as simply a "modulated signal."

In one embodiment, to effectively guard is to electrically isolate an adjacent electrode (such as the pixel electrode or any other nearby electrode) from the processing system. The electrical isolation will maintain the relative voltage between this isolated electrode and a sensor electrode being driven for capacitive sensing unchanged. However, the isolated electrode will also have parasitic capacitance to other electrodes, which will cause the voltage on the isolated electrode to not be different relative to the sensor electrode driven for capacitive sensing. These other electrodes may also be driven with a guarding signal. In one embodiment the pixel electrodes are isolated when the gate line turns off the access transistor.

In other embodiments, nearby electrodes are driven with a guarding signal, substantially reducing the parasitic capacitance between the sensor electrode driven for capacitive sensing and nearby electrodes. In one embodiment, an amplitude of the guarding signal maybe larger or smaller than the amplitude of the modulated signal.

Any practical form of modulation may be applied by a modulated power supply. In some embodiments, the modulation applied by the modulated power supply is a sine wave having a frequency of between 100 kHz and 500 kHz. In other embodiments, other waveforms and/or frequencies may be applied. In some embodiments, the power supply comprises an isolated power supply. In other embodiments, the power supply comprises a non-isolated power supply.

One benefit of including the modulated power supply in input device 100 is that because the sensor electrodes 120 are held at a constant voltage with respect to the modulated ground signal, the circuitry for driving the sensor electrodes 120 can be fabricated with minimal complexity. An example of suitable circuitry is provided with respect to FIG. 6.

A further benefit of including the modulated power supply is that when the components of the input device 100 are modulated, power consumption related to induced current drawn due to parasitic capacitance is reduced. Thus, the amount of power required to drive the sensor electrodes 120 is reduced as compared with an input device 100 that does not include a modulated power supply.

A further benefit of including the modulated power supply in input device 100 is realized in embodiments of the input device 100 that include a display device. With many traditional touch/display embodiments, touch sensing must be conducted at a time in which pixels in the display are not being updated. Embodiments of the present invention comprising an input device 100 integrated with a display device benefit from the inclusion of a modulated power supply because a modulated power supply helps to facilitate a touch and display timing scheme in which touch sensing and display updating are performed during at least partially overlapping time periods. This overlapping timing scheme is also referred to as "overlap timing" herein. Overlap timing is discussed in more detail with respect to FIG. 4B. Embodiments that include a display are now discussed is greater detail with respect to FIGS. 3-7B.

Figure 3:
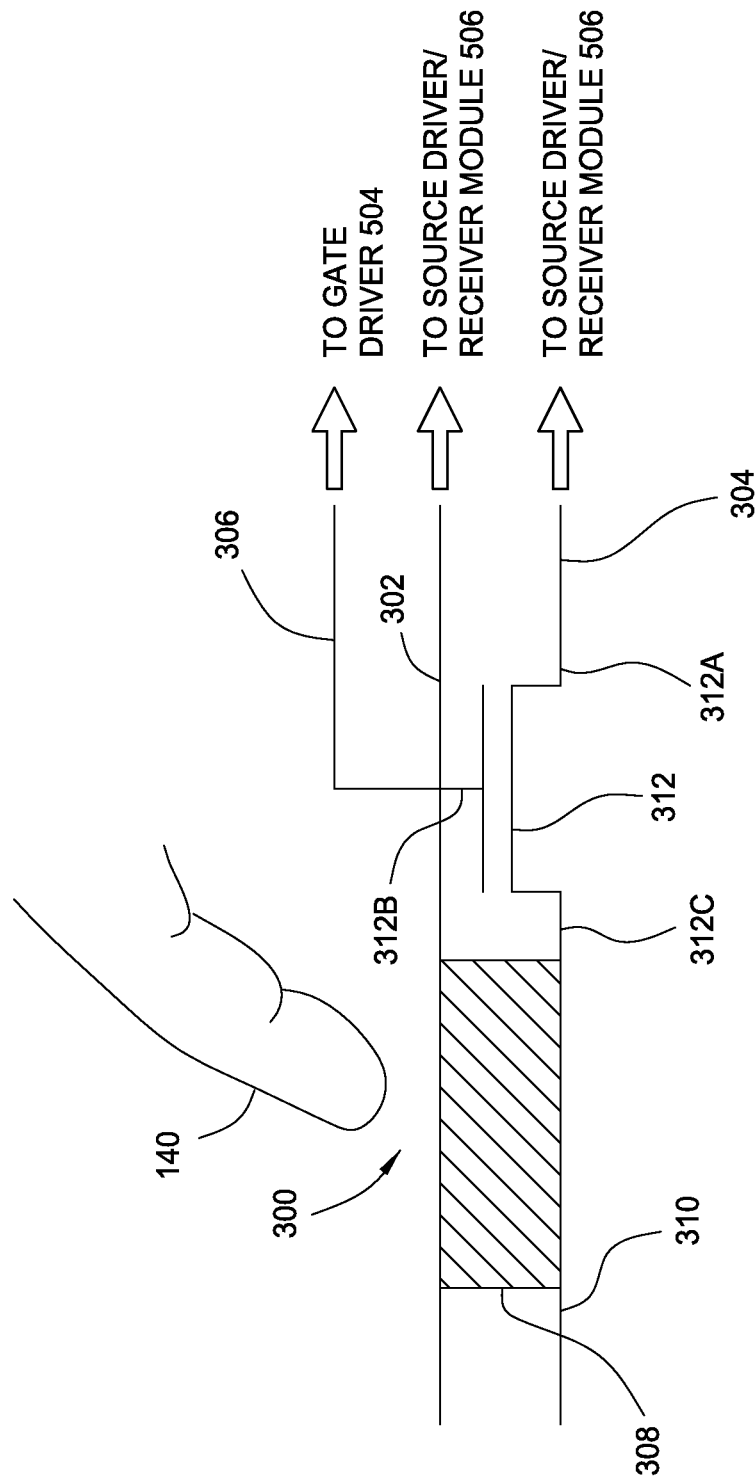
FIG. 3 is a cross-sectional partial schematic view of a liquid crystal display cell.

FIG. 3 is a cross-sectional partial schematic view of a liquid crystal display cell 300. The display cell 300 includes a common voltage layer ($V_{COM}$ layer) 302, a source line 304, a gate line 306, liquid crystal material 308, a pixel electrode 310, and a pixel transistor 312 having a source 312a, a gate 312b, and a drain 312c. Although display cell is depicted as a liquid crystal display cell 300, it should be recognized that display cell 300 may a different type of display cell, such as, for example, organic light-emitting-diodes (OLEO).

The $V_{COM}$ layer forms one electrode of a capacitor that includes liquid crystal material 308 as the dielectric. A pixel electrode 310 forms the opposite electrode of the capacitor. Applying a voltage across liquid crystal material 308 causes the liquid crystal material 308 to change optical properties, which allows more or less light emitted from a backlight to pass through the liquid crystal material 308. The voltage level across the liquid crystal material 308 determines the amount of light that passes through the liquid crystal material 308.

Updating pixel values is thus generally accomplished by setting the pixel electrode 310 to a certain voltage with respect to the $V_{COM}$ layer 302. $V_{COM}$ is typically held at a level somewhere between system ground and system $V_{CC}$ (i.e., the power supply voltage). Generally, $V_{COM}$ is held in the middle of these two voltages. The purpose of holding $V_{COM}$ at an intermediate voltage, rather than at absolute ground or at $V_{CC}$ is so that a voltage balancing scheme such as dot inversion can be used. Dot inversion is a scheme whereby liquid crystal materials 308 are alternately charged with positive and then negative voltage, so that a single voltage direction is not always applied across the liquid crystal materials 308. Because liquid crystal materials 308 may experience fatigue if voltage in only a single direction is repeatedly or constantly applied, the inversion schemes described above help to reduce or eliminate this fatigue.

In addition to functioning as a reference voltage for updating pixel values, $V_{COM}$ may also be operated as a sensor electrode 120 for touch sensing. In prior art input devices in which $V_{COM}$ is operated as a sensor electrode 120, pixel values are updated, and then touch sensing is conducted. In other words, typically, "overlap timing" is not performed, as described in greater detail below with respect to FIG. 4A. However, as described with respect to FIG. 4B, embodiments of the present invention allow touch sensing and display updating to be performed in overlapping time periods.

Figure 4A:
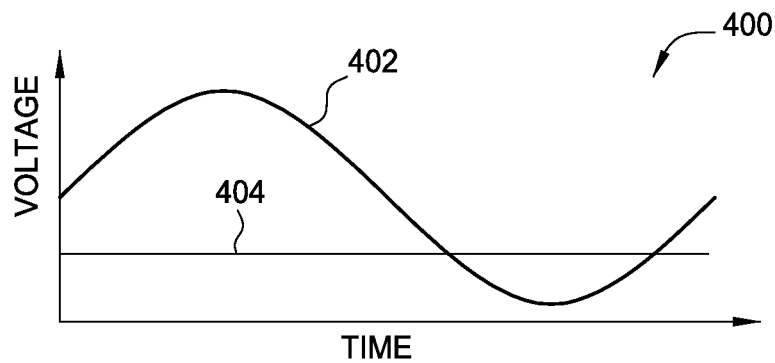
FIG. 4A illustrates a graph depicting operation of a conventional input device with touch sensing and pixel updating occurring simultaneously without a modulated power supply.

FIG. 4A illustrates a graph 400 depicting operation of a conventional input device with touch sensing and pixel updating occurring simultaneously without a modulated power supply. As can be seen by $V_{COM}$ graph 402, while the voltage for $V_{COM}$ is varying over time, the voltage at the pixel electrode, indicated by pixel electrode graph 404, stays constant. Because the voltage for $V_{COM}$ is varying, the voltage difference between the pixel electrode and the $V_{COM}$ electrode varies over time, which means that the desired voltage differential across the liquid crystal material 308 is not being applied. This graph 400 illustrates the traditional reason why pixel updates and touch sensing cannot be performed at the same time. A different scheme, depicted in FIG. 4B, allows pixel updates and touch sensing to be performed at the same time.

Figure 4B:
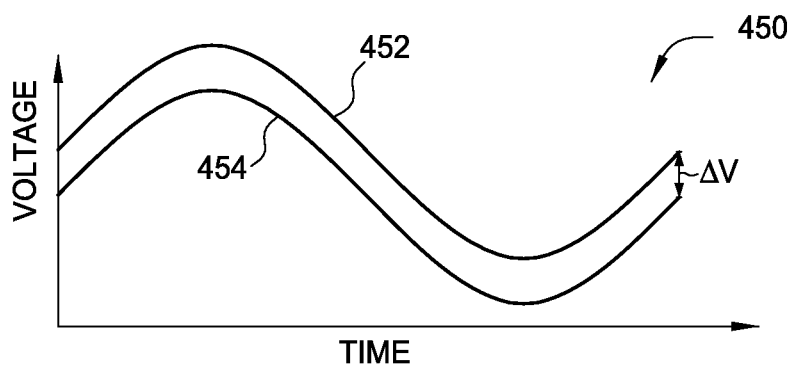
FIG. 4B illustrates a graph depicting operation of an input device with touch sensing and pixel updating occurring simultaneously, utilizing a modulated power supply.

FIG. 4B illustrates a graph 450 depicting operation of an input device with touch sensing and pixel updating occurring simultaneously, utilizing a modulated power supply. As can be seen, both the graph for $V_{COM}$ 452 and the graph for the pixel electrode 454 vary with time. Additionally, the voltage differential (indicated by $\Delta V$) between the pixel electrode 454 and $V_{COM}$ 452 remains substantially constant.

Because the voltage on $V_{COM}$ varies over rime, $V_{COM}$ can be used to detect capacitive coupling between $V_{COM}$ and an input object 140. More specifically, the varying voltage of $V_{COM}$ with respect to an input object 140 will induce an amount of current flow in $V_{COM}$ that can be measured. Although the voltage of the pixel electrode 454 is varying over time with respect to earth ground, the voltage differential between the pixel electrode 454 and $V_{COM}$ 452 remains substantially constant. Thus, a constant voltage differential is applied across the liquid crystal material 308, which means that the liquid crystal material 308 is able to be adjusted to a desired transmittivity. Any voltage differential between the pixel electrode and $V_{COM}$ may be selected. As long as this voltage differential remains substantially constant, a desired value is applied to the sub-pixel element.

As has been illustrated by FIGS. 4A-4B, to use electrode(s) (or $V_{COM}$) as a sensor electrode, $V_{COM}$ is modulated. This means that traditionally, updating the pixel values cannot be done at the same time that the input object is sensed. However, by modulating the power supply, $V_{COM}$ is modulated with respect to earth ground, and is held constant with respect to the voltage applied to the pixel electrode 310, which is also modulated. Further, by modulating the power supply, conductive elements within display cell 300 are modulated as well, which means that parasitic capacitance between $V_{COM}$ and these conductive elements is reduced as compared with an input device 100 that does not include a modulated power supply. Further, because $V_{COM}$ is modulated, sub-pixel values can be updated at the same time that the input object is sensed.

Figure 5A:
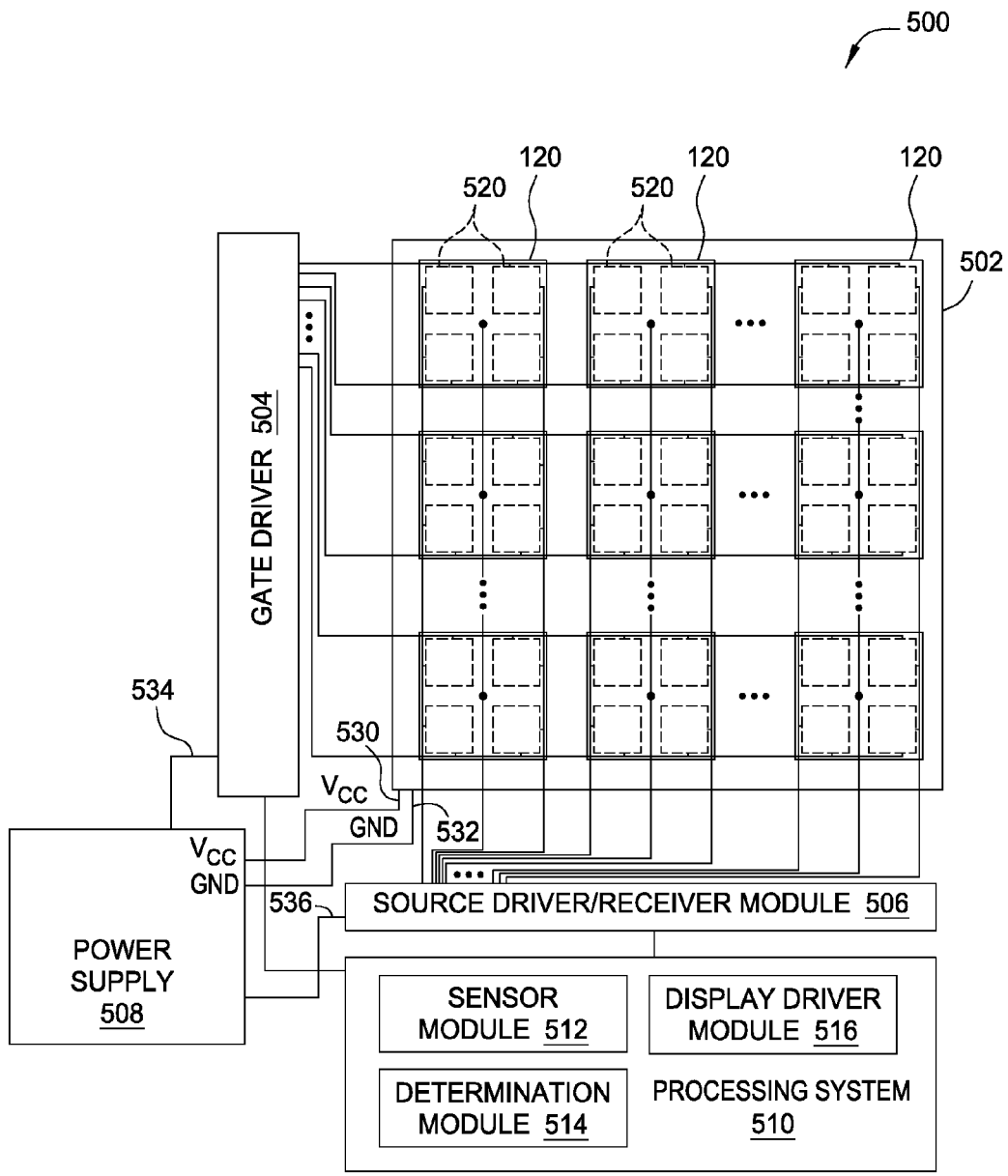
FIG. 5A illustrates a schematic diagram of a display device integrated with an input device.

FIG. 5A is a schematic diagram of a display device 500 integrated with an input device and including a modulated power supply, according to an embodiment. As shown, the display device 500 includes display panel 502, gate driver 504, source driver/receiver module 506, modulated power supply 508, and processing system 510. Processing system 510 includes various modules, such as sensor module 512, determination module 514, and display driver module 516. The display panel 502 includes sensor electrodes 120 that comprise common voltage ($V_{COM}$) electrodes. The display panel also includes sub-pixel elements 520. The sub-pixel elements 520 include components for displaying colors in pixels. The display panel 502 also includes a backlight and other components that are not shown.

Referring momentarily to FIG. 3, the sub-pixel elements 520 each include pixel transistors for driving pixel electrodes 310. As depicted in FIG. 3, the pixel transistors include a gate 312b, a source 312a, and a drain 312c. The gate 312b is coupled to gate driver 504. The source 312a is coupled to source driver/receiver module 506. The drain 312c is coupled to the pixel electrode 310. As described with respect to FIG. 3, the sub-pixel elements 520 may have a construction based on a different technology than liquid crystal (such as OLEO), in which case the sub-pixel elements 520 would have appropriate components.

Referring back to FIG. 5A, processing system 510 generally includes the functionality of processing system 110 depicted in FIG. 2A. The gate driver 504 and source driver/receiver module 506 generate signals to drive each of the sub-pixel elements 520 for display. More specifically, the gate driver 504 selects a row of sub-pixel elements 520 by providing a gate voltage to a particular row of sub-pixel elements 520. The source driver/receiver module 506 provides source signals to the sub-pixel elements 520 that are to be updated. The source signals are voltage levels chosen to apply a particular voltage differential across liquid crystal material 308 in order to cause liquid crystal material 308 to transmit the desired amount of light from the backlight, in liquid crystal display embodiments. In other display technology embodiments (such as organic light emitting diode (OLED), the source signals function differently, in accord with the particular display technology.

The source driver/receiver module 506 also includes circuitry configured to receive resulting signals from sensor electrodes 120. In some embodiments, the source driver/receiver module 506 includes multiple receiver channels that are each configured to measure the change in capacitance between one or more sensor electrodes 120 and an input device. In one embodiment, measuring the change in capacitance comprises holding a sensor electrode 120 at a particular voltage with respect to panel ground 532 while measuring an amount of current required to hold the sensor electrodes 120 at that voltage. An example of a receiver channel is circuit 600 depicted and described with respect to FIG. 6. Each of the sensing channels may be selectively coupled to one or more sensor electrodes 120 with selection circuitry such as one or more multiplexers.

The source driver/receiver module 506 may be embodied as one or more integrated circuit chips configured to perform both touch sensing and display updating functionality. In some embodiments, at least a portion of the functionality of the source driver/receiver module 506 is performed by the sensor module 512. In other embodiments, the sensor module 512 directs the source driver/receiver module 506 to drive the sensor electrodes 120 with desired signals. Further, in various embodiments, sensor module 512 receives and processes the measured changes in capacitance from the source driver/receiver module 506.

In some embodiments, processing system 510 is configured to cause power supply 508 to select between providing either a modulated reference signal or a non-modulated reference signal to source driver/receiver module 506 and to gate driver 504, so that sub-pixel elements 520 may be driven with either modulated or non-modulated signals. More specifically, the gate driver 504 receives a gate driver power supply voltage 534 that is either modulated or non-modulated depending on the selection of processing system 510. Similarly, the source driver/receiver module 506 receives a source driver power supply voltage 536 that is either modulated or non-modulated depending on the selection of processing system 510. These two power supply voltages may be referred to herein as "reference voltages" and, when modulated, as "modulated reference voltages." Thus, the source signals, that is, the signals provided to the source terminals 312a of the sub-pixel elements 520, and the gate signals, that is, the signals provided to the gate terminals 312b of the sub-pixel elements 520, are modulated or not modulated based on whether the processing system 510 causes the power supply 508 to provide modulated or non-modulated signals.

Figure 5B:
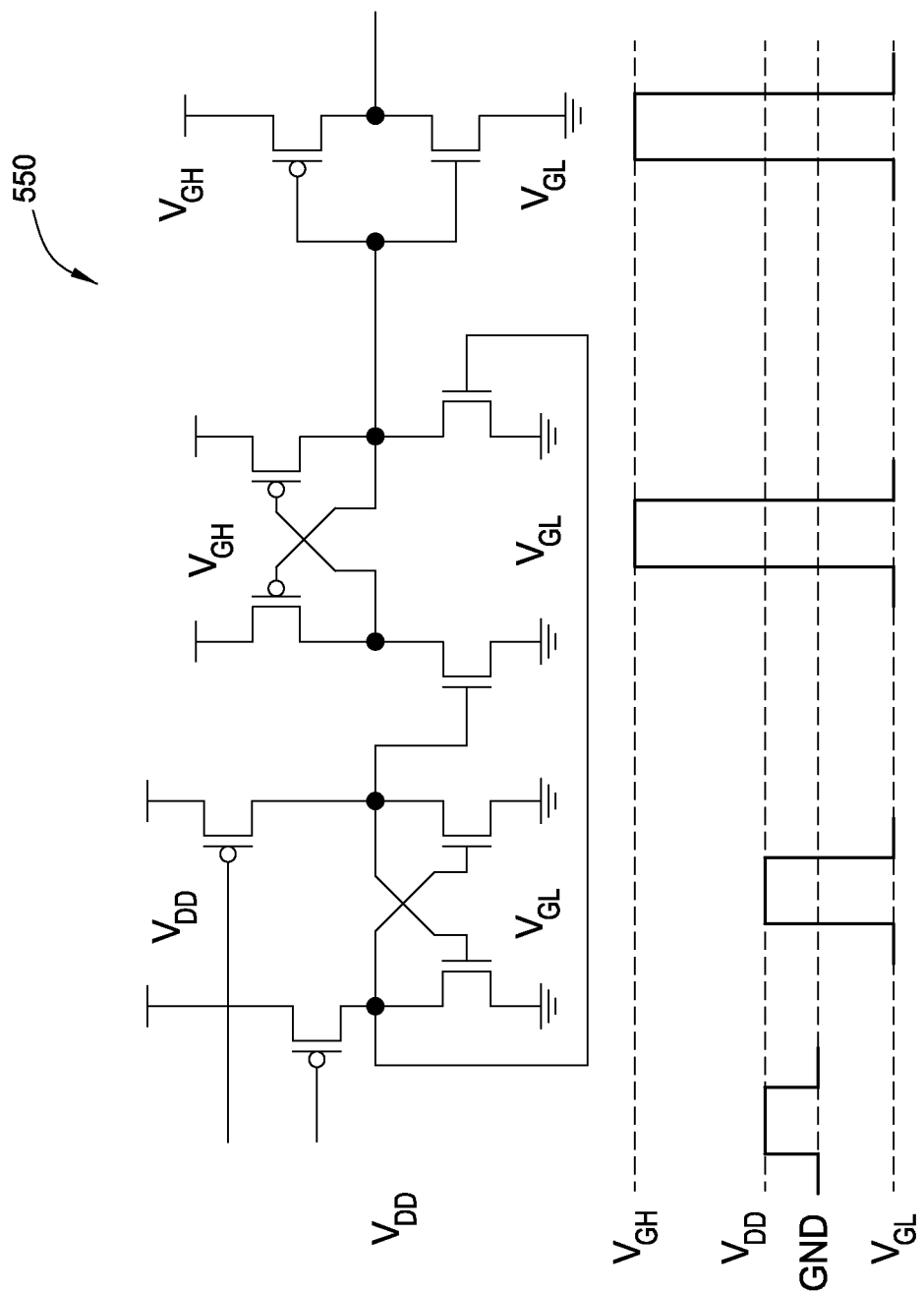
FIG. 5B illustrates an example circuit for providing a modulated voltage to a pixel transistor gate.

Referring momentarily to FIG. 5B, FIG. 5B illustrates an example circuit 550 for driving a gate line with a modulated signal, according to an embodiment. In the embodiment illustrated in FIG. 5B, the switch (transistor pair) determines if the voltage output to the gate line is either the gate voltage low (vgl) or voltage gate high (vgh) supply voltages. When the output is high, the voltage comes from vgh which is modulated, so the output is modulated. If the output is low, the voltage comes from vgl, so the output is also modulated.

Referring back to FIG. 5A, processing system 510 is configured to determine periods in which to drive sensor electrodes 120 and display electrodes (e.g., source electrodes and/or gate electrodes) together. In some embodiments, driving the display electrodes and sensor electrodes 120 together includes driving the display electrodes with display update signals and the sensor electrodes 120 with capacitive sensing signals at the same time.

During periods in which the processing system 510 drives the sensor electrodes 120 and display electrodes together, processing system 510 drives the sub-pixel elements 520 with modulated display update signals and also drives sensor electrodes 120 with modulated capacitive sensing signals. In some embodiments, the modulation applied to both display update signals and capacitive sensing signals comprise voltage variations to the same degree, frequency, and/or phase. In some embodiments, the modulation is applied uniformly, and thus the voltage differential between the signals applied to the source 312a of the pixel transistor 312 and the sensor electrode 120 remains constant. In these circumstances, sub-pixel values are updated while both the $V_{COM}$ (i.e., the sensor electrodes 120), source lines, and gate lines are modulated with respect to earth ground.

In addition to driving the sensor electrodes 120 and display electrodes together, at various different times, the processing system 510 may drive either display electrodes and not sensor electrodes 120, or sensor electrodes 120 and not display electrodes. In time periods in which the processing system 510 drives display electrodes but not sensor electrodes 120, processing system 510 may drive the display electrodes with non-modulated signals. Since sensor electrodes 120 are not driven with modulated signals during these time periods, effects related to parasitic capacitances are generally not experienced, and therefore the display electrodes are not driven with modulated signals for guarding.

In one example, the sensor module 512 is configured to drive sensor electrodes 120 with capacitive sensing signals that are based on a modulated reference signal during a first time period. These capacitive sensing signals are configured to modulate sensor electrodes 120 so that capacitive sensing may be performed, as is described above. The display driver module 516 is also configured to drive display electrodes with modulated display update signals based on the modulated reference signal for display updating during the first time period. The display update signals are configured 10 cause voltage between the display electrodes and the sensor electrodes to remain substantially constant. Thus, in the first time period, in which both capacitive sensing and display updating occurs, the display update signals and the touch sensing signals are both modulated, which reduces the effects of parasitic capacitance. The first time period may include all or part of the display update times discussed above with respect to FIG. 2A.

Additionally, in some embodiments, the sensor module 512 is configured to drive the sensor electrodes 120 for capacitive sensing during a second time period, during which no display updating occurs. In the second time period, the display electrodes may be caused to float by switching off the associated pixel transistor. In such a situation, where the display electrodes are floating, due to capacitive effects, the voltage at the display electrodes generally follows the voltage of the sensor electrodes 120 and thus does not contribute to parasitic capacitances described above. Thus, in the second time period, in which capacitive sensing occurs, but display updating does not occur, the display electrodes are not driven with modulated signals. In other embodiments, the display electrodes may be held at a constant voltage. The second time period may include all or part of the non-display update periods (also referred to as "display update times") discussed above with respect to FIG. 2A.

Further, in some embodiments, the sensor module 512 is configured to not drive the sensor electrodes 120 for capacitive sensing during a third time period, during which the display driver module 516 drives display electrodes for display updating. During the third time period, the display driver module 516 drives the display electrodes with non-modulated display signals. In the third time period, because the sensor electrodes are not driven for capacitive sensing, the parasitic capacitance effects described above generally do not affect capacitive sensing, and thus the display electrodes are not driven with modulated signals. The third time period may include all or part of the display update time discussed above with respect to FIG. 2A. In various embodiments, any combination of the first, second, and third time periods may occur. For example, the first and second time periods may occur, the first and third time periods may occur, the second or third time periods may occur, or other combinations of such time periods.

The processing system 510 also includes a determination module 514 including determination circuitry configured to process signals received from source driver/receiver module 506. In some embodiments, the processing system 510 is configured to determine changes in capacitive coupling between the sensor electrodes 120 and input object 140. The determination module 514 may be selectively coupled to each of the receiver channels in source driver/receiver module 506.

The display driver module 516 may be included in or separate from the processing system 510. The display driver module 516 includes circuitry configured to provide display image update information to the display of the display panel 502. More specifically, the display driver module 516 includes circuitry for controlling gate driver 504 and source driver/receiver module 506 to update sub-pixel elements 520 to specified values.

In one embodiment, the input device 100 comprises at least one capacitive sensing controller coupled with modulated power supply 508. The capacitive sensing controller may be configured to provide the modulated power supply 508 with a modulated reference signal such that the modulated power supply 508 is configured to provide the modulated signals to the various display electrodes and the sensor electrodes. In one embodiment, the modulated power supply 508 is configured to provide modulated reference signals to the gate lines, source lines and or common electrodes. In another embodiment, input comprises a timing controller coupled with a modulated power supply 508, wherein the timing controller is configured to provide the modulated power supply 508 with the modulated reference signal.

When $V_{COM}$ is modulated, $V_{COM}$ can be used to detect the presence of an input object through capacitive coupling. As the voltage at $V_{COM}$ changes because of the modulation, a signal is generated that is indicative of an amount of capacitive coupling between the sensor electrode 120 and an input object 140. An example circuit 600 for measuring the capacitive coupling in this manner is provided below with respect to FIG. 6.

Figure 6:
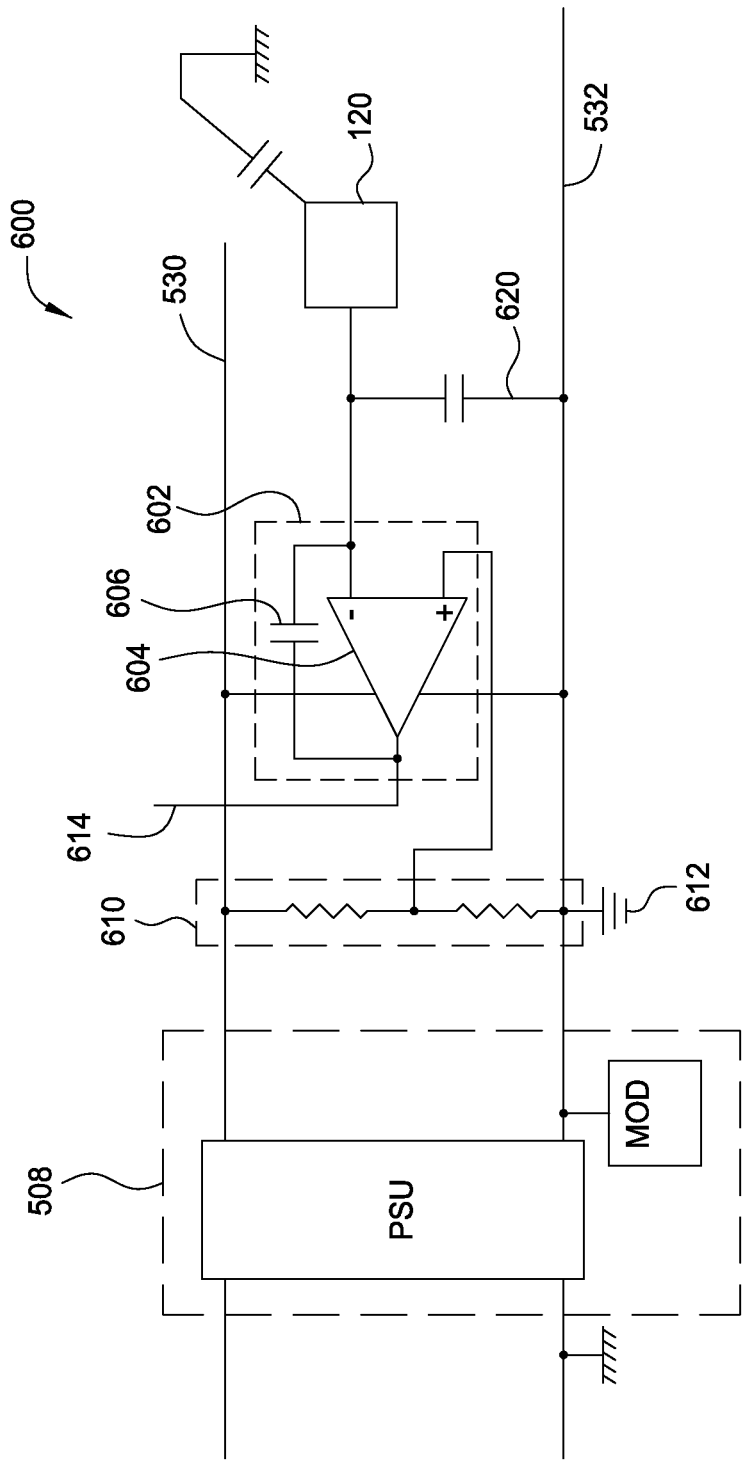
FIG. 6 illustrates an example circuit for driving a sensor electrode for capacitive touch sensing.

FIG. 6 illustrates an example analog front end channel 600, also referred to herein as an "AFE channel" for driving the sensor electrode 120 for capacitive touch sensing. As shown, the AFE channel 600 includes a charge accumulator 602, a modulated power supply 508, a voltage divider 610, and sensor electrode 120. It should be recognized that while the modulated power supply 508 depicted in FIG. 6 is part of an electric circuit with the AFE channel 600 and is thus electrically coupled to the other components depicted in FIG. 6, the modulated power supply 508 represents modulated power supply 508 depicted in FIG. 5A. Therefore, modulated power supply 508 depicted in FIG. 6 may be located in a different physical location from the rest of AFE channel 600. Additionally, it should be understood that while the sensor electrode 120 is electrically coupled to the AFE channel 600 as shown in FIG. 6, the sensor electrodes 120 are not physically located within AFE channel 600.

The AFE channel 600 includes a charge accumulator 602 for determining an amount of charge required to hold the sensor electrode at a constant voltage with respect to a modulated ground signal. The charge accumulator 602 includes an operational amplifier 604 with capacitive feedback between the inverting input and the output of the operational amplifier. The non-inverting input is coupled to a reference voltage that is modulated. In one embodiment, the modulated reference voltage is the output of voltage divider 610, which maintains the modulated reference voltage at a fixed voltage between the voltage of modulated ground and modulated power supply voltage. The positive voltage power supply terminal and negative voltage power supply terminals of the operational amplifier are coupled to the modulated power supply line 530 and the modulated ground line 532 of the display panel 502, respectively.

As the modulated power supply voltage, modulated ground voltage, and modulated reference voltage change due to the modulation, the output of the operational amplifier adjusts accordingly. More specifically, the operation amplifier is configured such that the inverting input of the operational amplifier follows the modulation signal applied to the non-inverting input of the operational amplifier. Thus, the inverting input of the operational amplifier, which is coupled to the sensor electrode 120, causes the sensor electrode 120 to follow the modulation signal. The voltage at the output of the operational amplifier indicates an amount of charge required to hold sensor electrode 120 at a constant voltage with respect to the modulated ground signal 612.

The charge accumulator 602 operates to maintain the sensor electrode 120 at a constant voltage with respect to the modulated ground signal, although at a modulating voltage with respect to an input object 140. When an input object 140 is brought into the sensing region 170 near the sensor electrode 120, the amount of current that the operational amplifier is required to flow in order to cause the voltage of the sensor electrode 120 to track the modulation changes as compared with a state in which no input object 140 is present in the sensing region 170. This amount of current flow is thus indicative of capacitive coupling between the sensor electrode 120 and the input object 140 and is reflected in the output of the operational amplifier.

The output of the charge accumulator 602 may be coupled to various supporting components such as demodulator circuitry, a low pass filter, sample and hold circuitry, other use electronic components, such as filters and analog-to-digital converters (ADCs) or the like. The supporting components function to take measurements from the charge accumulator 602 related to the capacitive coupling, or lack thereof, of the sensor electrode 120 to an input object 140.

Parasitic capacitance 620 is not a discrete element, but instead represents an amount of capacitance between the sensor electrode 120 and other components in input device 100. Modulating the power supply reduces the amount of parasitic capacitance as compared with an input device that does not include a modulated power supply.

Figure 7A:
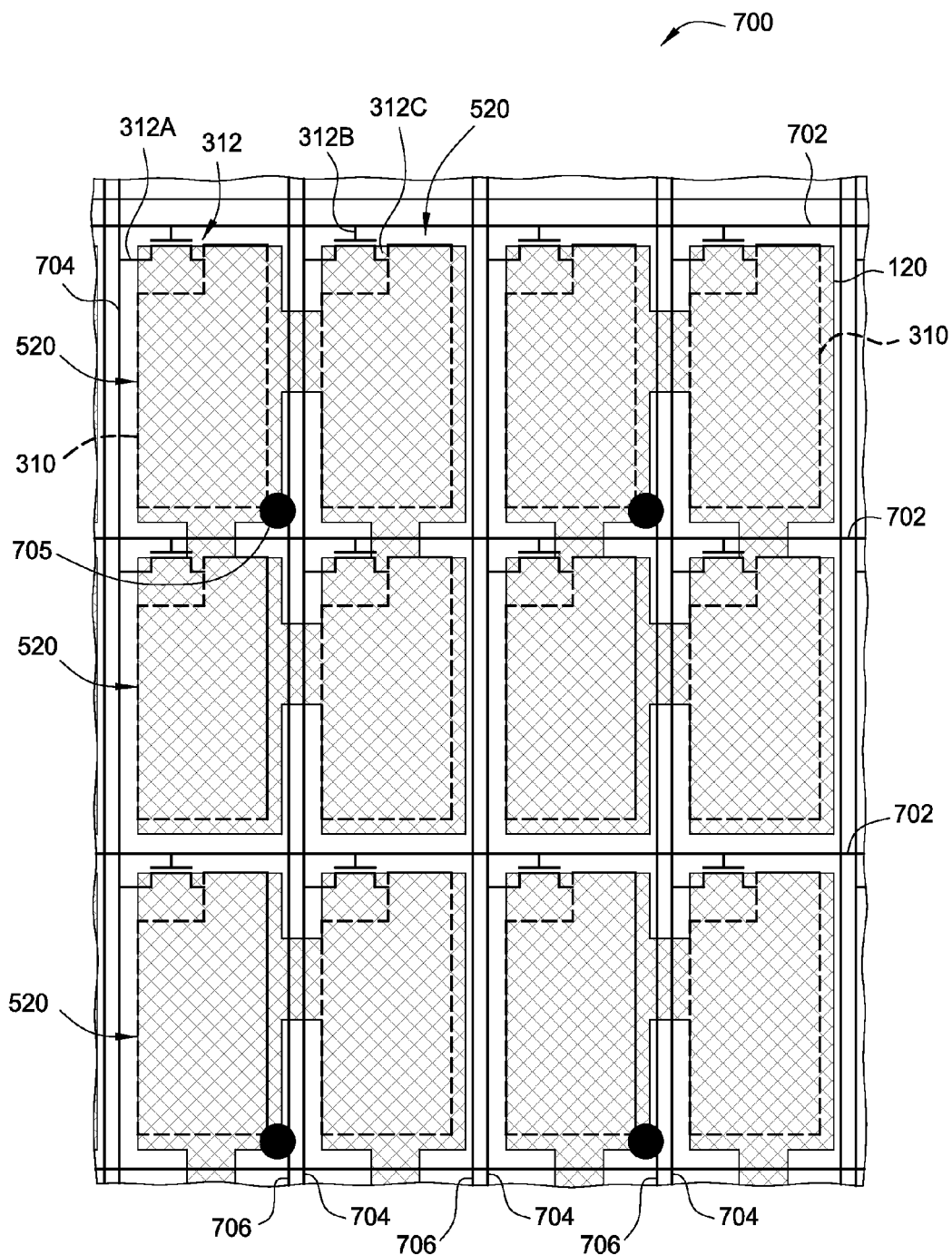
FIG. 7A is a close-up top-down view of a portion of display panel.
Figure 7B:
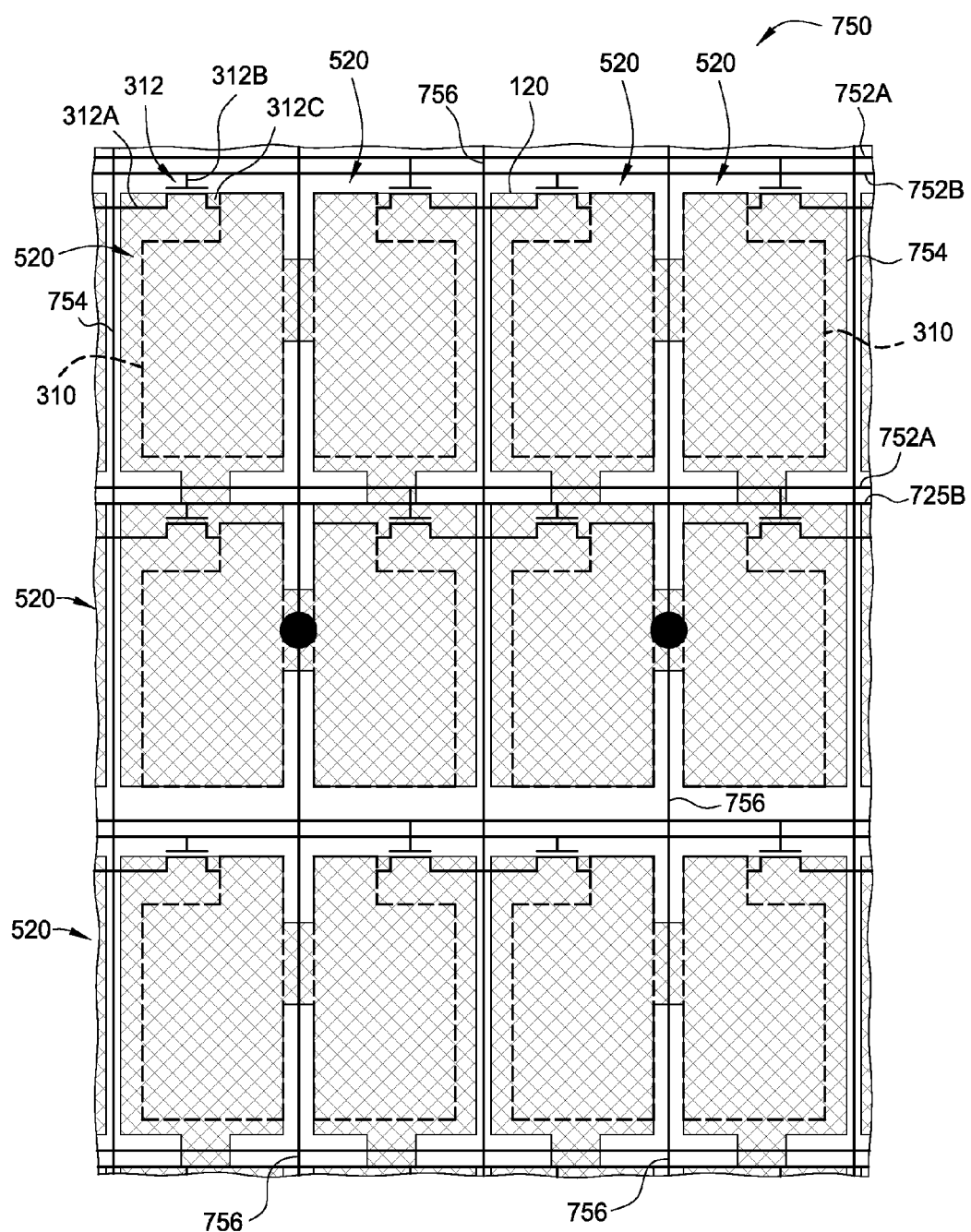
FIG. 7B is a close-up top-down view of a portion of display panel.

FIGS. 7A and 7B illustrate several display panel configurations that illustrate different layouts for routing traces to the sensor electrode 120 and sub-pixel elements 520. FIG. 7A illustrates a configuration that includes a single gate line. FIG. 7B illustrates a configuration that includes a dual gate line.

FIG. 7A is a close-up top-down view of a portion of display panel 502 depicting a configuration 700 of touch and display elements. The configuration 700 includes sensor electrodes 120 and sub-pixel elements 520.

Each of the sensor electrodes 120 comprises a portion of a segmented $V_{COM}$ layer. Each sensor electrode 120 is roughly rectangular in shape; as shown. Additionally, each sensor electrode 120 overlaps four sub-pixel elements 520. In various embodiments, the sensor electrodes 120 may overlap more or fewer than four sub-pixel elements 520. The sensor electrodes 120 are ohmically isolated from each other, so that each sensor electrode 120 can be driven separately. Although depicted with a specific shape in FIG. 7A, the sensor electrodes 120 may be formed in any feasible shape, as those of ordinary skill in the art would understand.

Sub-pixel elements 520 include a pixel electrode 310. Liquid crystal material, not shown in FIG. 7A, is disposed between the pixel electrode 310 and the sensor electrode 120. The pixel electrode 310 and sensor electrode 120 work together to provide a voltage across the liquid crystal material, as described with respect to FIG. 3.

Each of the sub-pixel elements 520 includes a pixel transistor 312 having a gate 312b, a source 312a, and a drain 312c. Gate lines 702 couple the gates 312b of the pixel transistors 312 to gate driver 504. Similarly, source lines 704 couple the sources 312a of the pixel transistors 312 to source driver/receiver module 506. Sensor electrode line 706, which is coupled to sensor electrode 120 through connection element 705, and is disposed adjacent to source line 704, provides signals to the sensor electrode 120, and is coupled to source driver/receiver module 506.

When a gate line 702 is activated, a signal provided over a source line 704 is driven through the pixel transistor 312 activated by the gate line 702 to the pixel electrode 310 for the sub-pixel element 520 common to both the driven gate line 702 and the driven source line 704. At the same time, the sensor electrode 120, acting as a $V_{COM}$ electrode, is held at a constant voltage with respect to panel ground 532. The sensor electrode 120 is coupled to an AFE channel, such as AFE channel 600, in source driver/receiver module 506, which determines an amount of current required to hold the sensor electrode 120 at the constant voltage. Thus, pixel updating and touch sensing are performed at the same time.

FIG. 7B is a close-up top-down view of a portion of display panel 502 depicting a configuration 750 of touch and display elements. As shown, the configuration 750 depicts sensor electrodes 120 and sub-pixel elements 520.

The sensor electrodes 120 and sub-pixel elements 520 are similar to those depicted in FIG. 7A. However, each row of sub-pixel elements includes a first gate line 752a and a second gate line 725b instead of just a single gate line 702 as in FIG. 7A. The sub-pixel elements 520 are alternatively coupled to the first gate line 752a and the second gate line 752b. The use of two gate lines frees up space for the sensor electrode line 756. This is because each of the source lines 754 can be used for two adjacent sub-pixels, which are selected by two different gate lines 752*a* and 752*b*.

In addition to the configurations depicted in FIG. 7A and FIG. 7B, configurations in which the sensor electrode lines are disposed above or below the source lines or drain lines are possible as well. More specifically, the sensor electrode lines may be disposed directly above or below either the gate line or the source line, instead of being adjacent to either of those lines.

CONCLUSION

Various embodiments of the present technology provide input devices and methods for reducing parasitic capacitance in a capacitive sensing input device. Particularly, embodiments described herein advantageously utilize a modulated power supply to modulate signals within an input device to reduce the parasitic capacitances experienced by sensor electrodes in the input device. Additionally, some other embodiments provide a display device with touch sensing capabilities that includes a modulated power supply to modulate signals provided to display elements and touch sensing elements within the display device. With a modulated power supply, capacitive coupling between sensor electrodes and other components of the input device is reduced, thereby increasing the ability to sense input objects.

Thus, the embodiments and examples set forth herein were presented in order to best explain the embodiments in accordance with the present technology and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed.

In view of the foregoing, the scope of the present disclosure is determined by the claims that follow.

What we claim is:

1. A processing system comprising:
a sensor module configured to drive a plurality of sensor electrodes with a modulated capacitive sensing signal that is based on a modulated reference signal for capacitive sensing during a first time period; and
a display driver module configured to drive a plurality of display electrodes of a display device with modulated signals based on the modulated reference signal during the first time period,
wherein the plurality of display electrodes and the plurality of sensor electrodes have a substantially constant voltage differential during the first time period.

2. The processing system of claim 1, wherein:
the display driver module is configured to drive the plurality of display electrodes with the modulated signals for display updating during the first time period, and wherein during the first time period, capacitive sensing and display updating occur in an at least partially overlapping manner.

3. The processing system of claim 1, wherein:
the display driver module is configured to drive the plurality of display electrodes with substantially non-modulated signals for display updating during a second time period, wherein the first time period and the second time period are non-overlapping.

4. The processing system of claim 3, wherein:
the sensor module is further configured to not drive the plurality of sensor electrodes for capacitive sensing during the second time period.

5. The processing system of claim 1, wherein:
each of the plurality of sensor electrodes comprises at least one common electrode of the display device.

6. The processing system of claim 1, wherein the plurality of display electrodes comprise at least one of a plurality of source electrodes and a plurality of gate electrodes.

7. The processing system of claim 1, wherein the modulated signals are at least one of modulated gate select signals and modulated source line update signals.

8. The processing system of claim 1, further comprising:
a modulated power supply configured to generate the modulated reference signal.

9. The processing system of claim 1, further comprising a capacitive sensing controller coupled with a power supply, wherein the capacitive sensing controller is configured to provide the power supply with the modulated reference signal and wherein the power supply is configured to provide the modulated capacitive sensing signal and the modulated display electrode signals.

10. The processing system of claim 1, further comprising a timing controller coupled to a power supply, wherein the timing controller is configured to provide the power supply with the modulated reference signal and wherein the power supply is configured to provide the modulated capacitive sensing signal and the modulated display electrode signals.

11. An input device comprising:
a plurality of sensor electrodes;
a plurality of display electrodes;
a modulated power supply configured to a provide a modulated reference signal; and
a processing system comprising:
a sensor module configured to drive a plurality of sensor electrodes with a modulated capacitive sensing signal that is based on the modulated reference signal for capacitive sensing during a first time period; and
a display driver module configured to drive a plurality of display electrodes of a display device with modulated signals based on the modulated reference signal during the first time period,
wherein the plurality of display electrodes and the plurality of sensor electrodes have a substantially constant voltage differential during the first time period.

12. The input device of claim 11, wherein:
the display driver module is configured to drive the plurality of display electrodes with the modulated signals for display updating during the first time period, and wherein during the first time period, capacitive sensing and display updating occur in an at least partially overlapping manner.

13. The input device of claim 11, wherein:
the display driver is configured to drive the plurality of display electrodes with substantially non-modulated signals for display updating during a second time period, wherein the first time period and the second time period are non-overlapping.

14. The input device of claim 11, wherein:
the sensor module is further configured to not drive the plurality of sensor electrodes for capacitive sensing during the second time period.

15. The input device of claim 11, wherein:
each of the plurality of sensor electrodes comprises at least one common electrode of the display device.

16. The input device of claim 11, wherein the processing system is configured to select between providing a modulated reference signal and a substantially non-modulated reference signal to the display driver module.

17. A method for operating an input device, comprising:
   driving a plurality of sensor electrodes with a modulated capacitive sensing signal that is based on a modulated reference signal for capacitive sensing during a first time period; and
   driving a plurality of display electrodes of a display device with modulated signals based on the modulated reference signal during the first time period,
   wherein the plurality of display electrodes and the plurality of sensor electrodes have a substantially constant voltage differential during the first time period.

18. The method of claim 17, wherein:
   driving the plurality of display electrodes further comprises driving the plurality of display electrodes with the modulated signals for display updating during the first time period,
   wherein during the first time period, capacitive sensing and display updating occur n an at least partially overlapping manner.

19. The method of claim 17, further comprising:
   driving the plurality of display electrodes with substantially non-modulated signals for display updating during a second time period, wherein the first time period and the second time period are non-overlapping.

20. The method of claim 19, further comprising:
   not driving the plurality of sensor electrodes for capacitive sensing during the second time period.

21. The method of claim 19, wherein:
   each of the plurality of sensor electrodes comprises at least one common electrode of the display device.

* * * * *